United States Patent [19]

Lagoni

[11] 4,245,237

[45] Jan. 13, 1981

[54] CONTROLLABLE NON-LINEAR PROCESSING OF VIDEO SIGNALS

[75] Inventor: William A. Lagoni, Indianapolis, Ind.

[73] Assignee: RCA Corporation, New York, N.Y.

[21] Appl. No.: 38,015

[22] Filed: May 11, 1979

[51] Int. Cl.³ .......................................... H04N 9/535
[52] U.S. Cl. ...................................... 358/31; 358/36; 358/37
[58] Field of Search ...................... 358/22, 31, 32, 36, 358/37, 164, 39, 166, 167, 184; 330/97, 103, 110, 282, 291; 307/230; 328/142, 143

[56] References Cited

U.S. PATENT DOCUMENTS

| 3,715,477 | 2/1973 | Olson et al. | 358/167 |
| 4,074,321 | 2/1978 | Miller | 358/31 |
| 4,096,516 | 1/1978 | Pritchard | 358/31 |

OTHER PUBLICATIONS

McMann et al., "Improved Signal Processing Techniques For Color Television Broadcasting," *Journal of SMPTE*, Mar. 1968, vol. 77, pp. 221-228.

*Primary Examiner*—John C. Martin
*Attorney, Agent, or Firm*—E. M. Whitacre; W. H. Meagher; R. H. Kurdyla

[57] ABSTRACT

A gain controllable circuit suitable for processing vertical detail signal information in a video signal is disclosed. The circuit exhibits a non-linear signal amplitude transfer function wherein different amounts of signal gain are imparted to signals having amplitudes within prescribed ranges. Small amplitude signals subject to restoration are translated with a prescribed restoration gain. Moderate amplitude signals subject to enhancement (peaking), and large amplitude signals subject to paring (amplitude reduction), are controllably amplified without altering the restoration gain characteristic for small signals.

10 Claims, 7 Drawing Figures

CONTROLLABLE NON-LINEAR PROCESSING OF VIDEO SIGNALS

This invention relates to a gain controllable signal processing circuit having a non-linear amplitude transfer function, including plural gain control regions, and a fixed gain region independent of gain control operation. In particular, the invention concerns such a circuit suitable for selectively processing small, moderate and large amplitude excursions of video signal vertical detail information.

In a color television system such as the system developed by the United States, the luminance and chrominance components of a color television signal are disposed within the video frequency spectrum in frequency interleaved relation, with the luminance components at integral multiples of the horizontal line scanning frequency and the chrominance component at odd multiples of one-half the line scanning frequency. Various comb filter arrangements for separating the frequency interleaved luminance and chrominance components of the video signal are known, for example, from U.S. Pat. No. 4,143,397 (D. D. Holmes) and U.S. Pat. No. 4,096,516 (D. H. Pritchard) and the reference cited therein.

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of the unshared band which are subject to such deletion are representative of "vertical detail" luminance information. Preservation of such vertical detail is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component (with an illustrative choice being just below 2 MHz). The filter selectively couples signals below the chrominance band from the chrominance output of the comb filter to a combining network where the selectively coupled signals are summed with combed luminance output signals from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to enhance or peak the vertical detail information of a displayed image by adding back to the luminance signal a greater amount of the vertical detail signal than is required to restore the luminance signal to its original form (i.e., a "flat" amplitude characteristic). The additional vertical detail signal then serves to emphasize vertical detail information so as to enhance picture detail resolution. For low level luminance signals, however, such enhancement tends to produce objectionable visible effects when noise interference is present and undesirably enhanced along with the vertical detail information of the luminance signal.

Also in this instance, alternate line set-up variations (ALSUV) when present in the video signal are also undesirably enhanced. The ALSUV phenomenon is a form of low level signal interference manifested by variations in the black level of the video signal from line-to-line, and may be caused by misalignment of signal processing systems at the broadcast transmitter, for example. The ALSUV interference is particularly noticeable for low level video signals of about five percent of the maximum expected video signal amplitude, and produces objectionable visible effects on a reproduced image which are undesirably magnified when vertical detail enhancement is provided.

A technique for minimizing the adverse effects of noise and other undesirable components of a video signal employs a process commonly referred to as signal "coring," wherein small amplitude excursions of the signal (including noise) are removed as described in U.S. Pat. No. 3,715,477 for example.

One advantageous system which accomplishes coring of the vertical detail signal in a manner which does not impair (e.g., "smear") vertical detail information, particularly with regard to low level detail signal information which is to be restored to the luminance signal, is described in a copending, concurrently filed U.S. patent application Ser. No. 38,202 of W. A. Lagoni and J. S. Fuhrer entitled "Video Image Vertical Detail Restoration And Enhancement," assigned to the present assignee. The system described therein also advantageously provides for enhancement of the vertical detail information substantially without simultaneously enhancing interfering signal components such as noise and alternate line set-up variations.

A system wherein large amplitude vertical detail signals are pared (amplitude reduced or attenuated) to prevent kinescope "blooming" which would otherwise distort or obscure detail information is disclosed in a copending, concurrently filed U.S. patent application Ser. No. 38,203 of J. S. Fuhrer entitled, "Non-Linear Processing Of Video Image Vertical Detail Information," assigned to the present assignee.

Consistent with the techniques described in the last-mentioned copending patent applications, in accordance with the principles of the present invention it is herein recognized as being desirable to provide a means for controlling the amount of signal enhancement and paring without affecting the signal which is to be restored. Accordingly, it is herein considered as being desirable to provide a signal processing circuit wherein small amplitude signals such as signals subject to restoration are translated with a given fixed gain, while moderate amplitude signals subject to enhancement and large amplitude signals subject to paring are comtrollably amplified without altering the fixed gain characteristics for small signal amplitude excursions.

A circuit for processing a video signal according to the present invention includes a first network for linearly translating the signal with a first gain, and a second network for linearly translating the signal with a second gain greater than zero. Also included is a third network having a non-linear transfer function, for translating small amplitude excursions of the signal with a third gain greater than zero in a third region, and for translating moderate amplitude excursions of the signal with a fourth gain greater than the third gain in a second region. A combining network combines signal outputs from the second and third translating networks to substantially cancel small signal amplitude excursions. Signals from the first translating network are then summed with the combined signal from the combining network.

In accordance with a feature of the present invention, the third translating network additionally translates large amplitude excursions of the signal with a gain less than the third gain.

In accordance with an additional feature of the invention, means are included for varying the magnitudes of the amplitude excursions of output signals from the combining network, without altering the transfer function for small signal amplitudes.

In accordance with a further feature of the invention, a circuit according to the principles of the present invention is employed in a color television receiver or similar system for translating vertical image detail information signals with a non-linear transfer function with respect to prescribed ranges of vertical detail signal amplitude.

Figure 1:
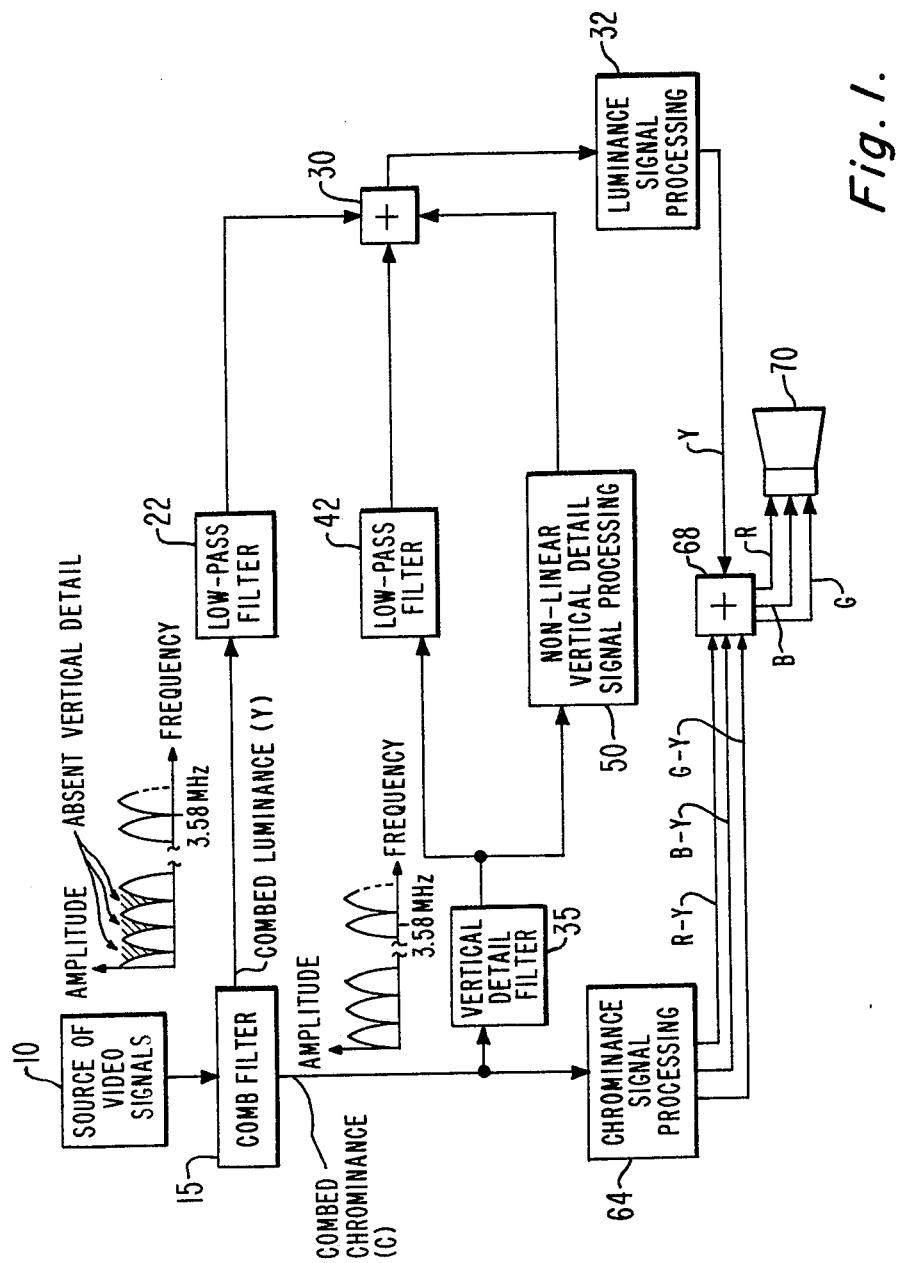
FIG. 1 illustrates a block diagram of a portion of a color television receiver employing a gain controllable non-linear signal processor according to the present invention.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No. 4,096,516. The luminance and chrominance components are arranged within the video signal frequency spectrum in frequency interleaved relation. The luminance component has a relatively wide bandwidth (extending from D.C. or zero frequency to about four megahertz). The upper frequency range of the luminance component is shared with the chrominance component, which comprises a subcarrier signal of 3.58 MHz amplitude and phase modulated with color information. The amplitude versus frequency response of comb filter 15 with respect to luminance combing action exhibits a peak amplitude response at integral multiples of the horizontal line scanning frequency (approximately 15,734 Hz), extending from D.C. or zero frequency, and an amplitude null at odd multiples of one-half the line scanning frequency, including the 3.58 MHz chrominance subcarrier frequency. The amplitude versus frequency response of comb filter 15 with respect to chrominance combing action exhibits a peak amplitude response at odd multiples of one-half the line frequency including 3.58 MHz, and an amplitude null at integral multiples of the line frequency.

A "combed" luminance signal (Y) from the luminance output of comb filter 15 is coupled via a low pass filter 22 to a first input of a signal combining network 30. Filter 22 is arranged to pass all luminance signals below a cut-off frequency of approximately 4 MHz, and serves to remove noise and clock frequency components of switching signals associated with the switching operation of comb filter 15 when of a CCD type comb filter.

A "combed" chrominance signal (C) from the chrominance output of comb filter 15 is applied to a chrominance signal processing unit 64 for generating R-Y, B-Y and G-Y color difference signals, and to an input of a low pass vertical detail filter 35. Unit 64 includes a suitable filter for passing only those signal frequencies from comb filter 15 which occupy the band of chrominance signal frequencies. Filter 35 exhibits a cut-off frequency of approximately 1.8 MHz, and selectively passes those signal frequencies present in the combed chrominance signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration as well as controlled vertical detail enhancement and paring is accomplished as follows.

Figure 4:
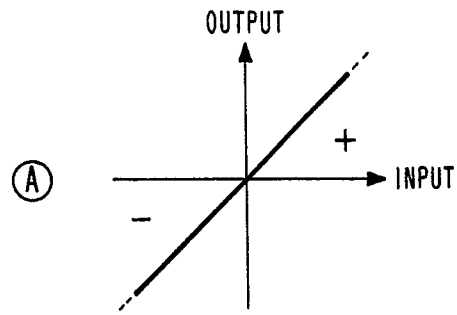
FIGS. 4–7 depict amplitude transfer functions which are useful in understanding the operation of apparatus according to the invention.

Vertical detail signals from the output of filter 35 exhibit a linear transfer function and are translated via a signal path including a low pass filter 42, to a second input of a combining network 30. The linear amplitude transfer function for these signals is of the form shown in FIG. 4 for both positive (+) and negative (−) signal polarities. Low pass filter 42 exhibits a cut-off frequency of approximately 2 MHz. Vertical detail signals from filter 35 also are supplied to a non-linear vertical detail signal processing circuit 50 which imparts different amounts of signal gain to vertical detail signals within three predetermined ranges of signal amplitude. Processed signals from network 50 are supplied to a third input of combiner 30, where they are summed with the signals coupled via filter 42 and with the combed luminace signal.

The output signal from combiner 30 corresponds to a reconstituted luminance component of the video signal with the vertical detail information thereof restored, and controllably enhanced and pared as will be discussed in connection with FIGS. 2 and 7. The reconstituted luminance component is afterwards coupled to a luminance signal processing unit 32. An amplified luminance signal Y from unit 32 and the color difference signals from chrominance unit 64 are combined in a matrix 68 for providing, R, B, and G color image representative output signals. These signals are then suitably coupled to image intensity control electrodes of a color kinescope 70.

Figure 2:
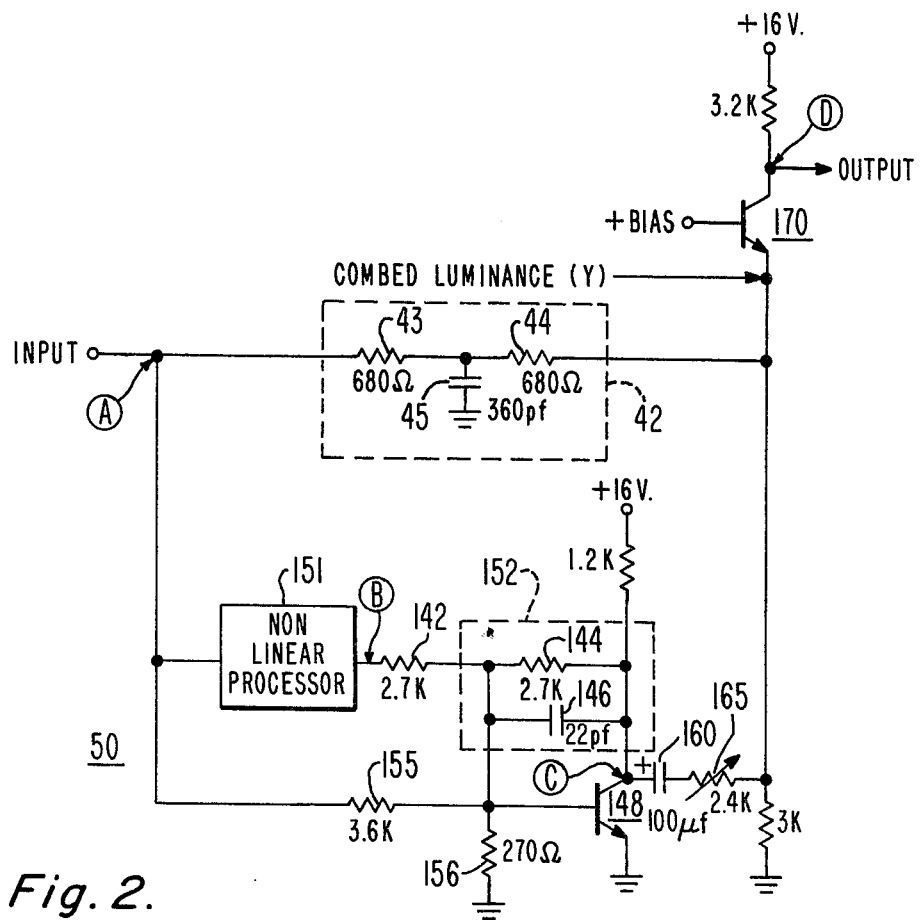
FIG. 2 shows an embodiment of gain controllable non-linear signal processing apparatus according to the present invention.

FIG. 2 shows circuit details of the network coupled between the output of vertical detail filter 35 and the input of luminance processor 32 in FIG. 1.

Linear detail signals from the output of filter 35 are supplied as input signals to the circuit of FIG. 2, and are coupled to a signal summing point at an emitter of a common base summing transistor 170 via filter 42 including resistors 43 and 44 and a capacitor 45 arranged as shown. These signals are linearly translated with an amplitude transfer function "A" of the form shown in FIG. 4.

Figure 3:
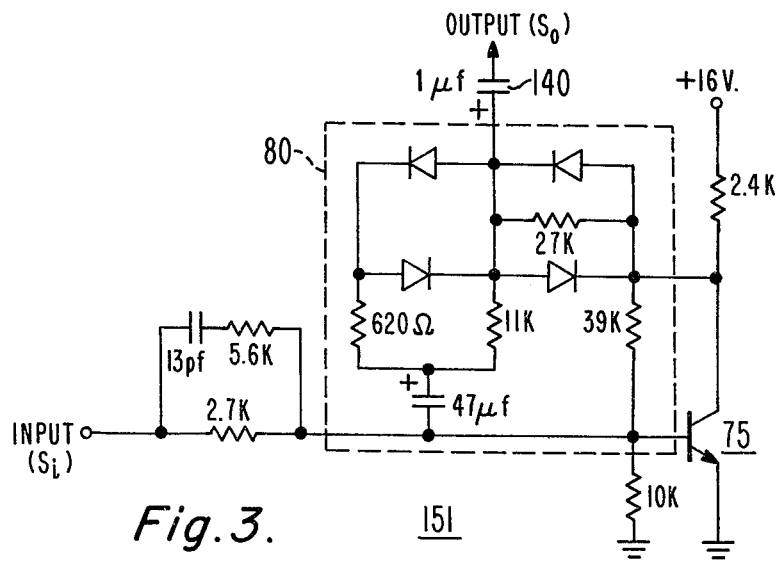
FIG. 3 shows a circuit embodiment of a portion of the signal processor shown in FIG. 2.
Figure 5:
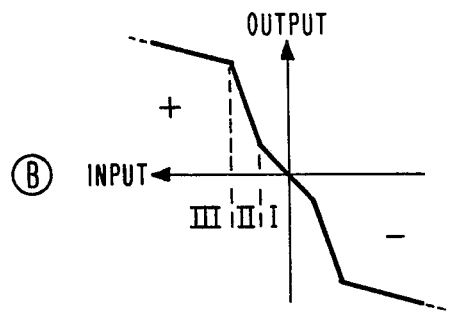

The detail signals from filter 35 are translated with a non-linear amplitude transfer (gain) function by a non-linear signal processor circuit 151, which is shown in FIG. 3 and described in detail in my copending, concurrently filed U.S. patent application Ser. No. 38,100 entitled "Signal Processing Circuit Having A Non-Linear Transfer Function," assigned to the present assignee. In the circuit of FIG. 3, input signals ($S_i$) from detail filter 35 are supplied to a base input of an amplifier circuit including a transistor 75 and an associated feedback network 80. Briefly, signal processor circuit 151 manifests a non-linear composite amplitude transfer function as shown in FIG. 5, for imparting different amounts of signal gain to signals having amplitudes within three ranges designated as I, II and III in accordance with a transfer function B shown in FIG. 5, for both positive (+) and negative (−) signal polarities. Processed vertical detail signals ($S_o$) from circuit 151 are A.C. coupled from an output of circuit 151 via a coupling capacitor 140. Small amplitude detail signals subject to restoration in region I are translated by circuit 151 with a given fixed gain of approximately two. Small amplitude excursions of moderate amplitude detail signals are also processed with the given fixed gain, while the peak amplitude excursions of moderate amplitude signals are amplified with a gain of approximately three in region II. The peak amplitude excursions of large amplitude signals subject to paring (amplitude reduction) are translated with less than the given fixed gain in region III. Small amplitude excursions of large amplitude signals are processed with the given fixed gain, and moderate amplitude excursions are amplified as mentioned above for region II.

The non-linearly processed signals from processor 151 are coupled via a summing resistor 142 to a base input of a transistor 148, where these signals are combined with detail signals coupled from the output of vertical detail filter 35 (FIG. 1) via a summing resistor 155. The signals coupled via resistor 155 also exhibit a linear amplitude transfer function of the form shown in FIG. 4. Transistor 148 operates as an inverting feedback summing amplifier transistor, and the base electrode of transistor 148 represents a "virtual ground" summing point.

Figure 6:
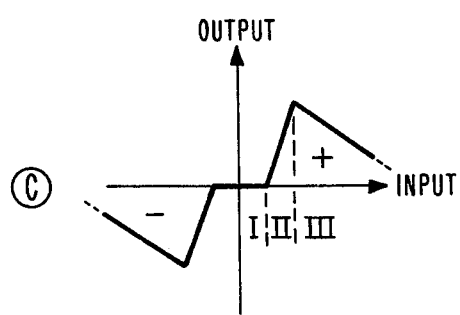

A non-linear amplitude transfer function "C" is associated with signals appearing at the collector output of transistor 148, as shown in FIG. 6. Specifically, the characteristics of transfer function C, and the level of signals appearing at the collector of transistor 148, are determined by the ratio of the value of a resistor 144 to the value of resistor 142, and by the ratio of the value of resistor 144 to the value of resistor 155. The ratio of the value of resistor 142 to the value of resistor 155 is selected so that small amplitude excursions of signals from unit 151 after processing in region I of transfer function B (FIG. 5) substantially cancel with small amplitude excursions of signals linearly translated via resistor 155, when signals coupled via resistors 142 and 155 are combined in transistor 148. That is, the linear signal transfer slope in region I of response B and the linear transfer slope associated with response A for signals coupled via resistor 155 mutually cancel in region I so as to produce non-linear transfer function C (FIG. 6) at the collector of transistor 148.

A resistor 156 in conjunction with resistors 144 and 155 serves to bias the collector of transistor 148. A capacitor 146 together with resistor 144 forms a low pass filter 152 with a cut-off frequency of approximately 1.8 MHz. Filter 152 serves to improve image definition particularly with respect to effects which may appear as visible disturbances along the edge of a displayed diagonal image pattern, as discussed in detail in a copending, concurrently filed U.S. patent application Ser. No. 38,204 of J. P. Bingham and W. A. Lagoni entitled "Image Detail Improvement In A Vertical Detail Enhancement System," and assigned to the present assignee.

The detail signal developed at the collector of transistor 148 is A.C. coupled via a capacitor 160 and a variable gain control resistance 165 to the emitter of transistor 170, where the non-linearly processed detail signal from network 50 is summed with the linearly translated signal coupled via filter 42, and with the combed luminance output of comb filter 15 (FIG. 1). A reconstituted luminance component including vertical detail signal information appears at the collector output of transistor 170 and is supplied to luminance signal processor 32 (FIG. 1).

Figure 7:
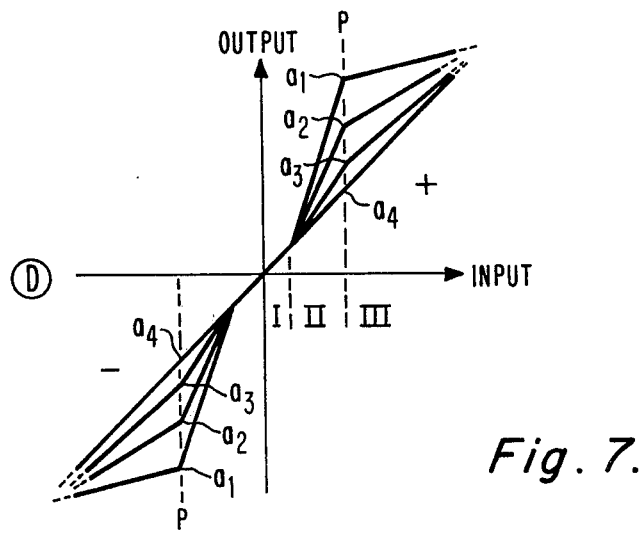

The vertical detail signal component of the signal developed at the collector of transistor 170 exhibits a controllable amplitude transfer response "D" as shown in FIG. 7. The transfer function of FIG. 7 includes plural transfer functions $a_1$ through $a_4$ for both positive (+) and negative (−) signal polarities, produced in response to adjustment of variable resistor 165 in FIG. 2. For each of the plural transfer functions, a prescribed fixed signal gain, hereinafter referred to as the restoration gain, is produced in region I for small signal amplitude excursions, while variable amounts of amplification are imparted to moderate and large signal amplitude excursions subject to processing in regions II and III, without altering the fixed gain transfer response in region I.

The restoration gain produced in restoration region I for low level signals (e.g., signal amplitudes of about five percent of maximum expected amplitude) is such that low level detail signals along with noise and other undesired components are processed without enhancement in region I. The peak amplitude of vertical detail signals of moderate amplitude (e.g., signal amplitudes between expected five percent and forty percent of maximum expected amplitude) are controllably processed within enhancement region II to thereby controllably emphasize the vertical detail information and picture definition in this region. The peak amplitude of relatively large amplitude vertical detail signals (e.g., between about forty percent of maximum expected amplitude and maximum amplitude) corresponding to high contrast images such as lettering, for example, are controllably processed within region III to controllably attenuate or pare the large amplitude excursions, which can be large enough to cause excessive contrast and kinescope "blooming" which would otherwise distort or obscure picture detail.

It is noted that in region I, low level vertical detail signal information has been restored in an amount sufficient to preserve normal low level vertical resolution in the luminance content of a displayed image. The amount of restoration gain in region I preferably corresponds to that amount of signal gain which, in a given system, is required to restore small amplitude excursions of the vertical detail component to the luminance signal so that an ultimately reconstituted luminance signal exhibits an essentially "flat" amplitude response with respect to small amplitude detail signals. In this connection, it is noted that the magnitude of the restoration gain is a function of various factors, including the signal translating characteristics of networks coupled between the outputs of comb filter 15 and a luminance processor 32 which processes ultimately reconstituted luminance signals, and the relative magnitudes of the signals appearing at the outputs of comb filter 15, for example.

The choice of the restoration gain as provided by the amplitude transfer response for region I also involves considerations of what results are acceptable in a given video signal processing system. For example, if the restoration gain is excessive, low level ALSUV signal interference is likely to be visible. If the restoration gain is insufficient, significant combing effects (i.e., signal peaks and nulls at different frequencies) will appear in the vertical detail frequency region below 2 MHz, resulting in less low level vertical detail information. Thus the slope of the amplitude transfer characteristic in region I corresponds to the amount of signal gain necessary to produce a desired response (i.e., a flat luminance response) without introducing unacceptable side effects. The signal amplitude response for region I preferably exhibits a fixed relationship with the response of the signal path which translates the combed luminance signal (Y) from the output of the comb filter 15.

In this example, the peak amplitude excursions of moderate amplitude signals are controllably amplified in region II between a maximum signal gain of approximately three, and a minimum signal gain of approximately two, which in this case corresponds to the magnitude of the restoration gain. However, small amplitude signals including small amplitude excursions of moderate amplitude signals are processed with the restoration gain (i.e., without enhancement). Thus enhancement of undesirable low level signal components including noise and ALSUV interference is essentially eliminated or reduced to an acceptable minimum, and image "smear" of low level vertical detail information is avoided.

Transfer response $a_1$ is produced at one extreme setting of variable resistor 165, and corresponds to a condition wherein a maximum amount of amplification or enhancement is imparted to moderate amplitude excursions in region II, and wherein a maximum amount of attenuation or paring is imparted to large amplitude excursions in region III. For this transfer response, a maximum signal gain of approximately three is imparted to signals processed in region II, and a gain less than the restoration gain is imparted to signals processed in region III.

The signal gains imparted to signals processed in regions II and III are caused to continuously vary in a mutually complementary manner for both signal polarities as resistor 165 is adjusted towards the other extreme setting. The fixed amount of restoration gain imparted to small signal amplitude excursions processed in region I does not vary as the gains of regions II and III are controlled.

Transfer response $a_2$ is produced at an intermediate setting of variable resistor 165 and corresponds to a condition wherein peak amplitude excursions of moderate amplitude signals are amplified in region II with less gain than that associated with response $a_1$. At the same time, peak amplitude excursions of large amplitude signals are processed in region III with more gain than that associated with response $a_1$. Thus the signal gains associated with regions II and III vary in a complementary manner as resistor 165 is adjusted Analogous observations pertain to intermediate transfer response $a_3$.

Transfer response $a_4$ is produced at the other extreme setting of variable resistor 165, and corresponds to a condition wherein a minimum amount of amplification is imparted to signals processed in region II, and wherein a minimum amount of attenuation or paring is imparted to signals processed in region III. In this example, the minimum response associated with transfer response $a_4$ for regions II and III is limited by the slope of the restoration transfer function associated with region I. Thus the signal gain imparted to signals processed in regions II and III equal the restoration gain imparted to signals in region I, whereby the restoration gain corresponds to the minimum gain available in region II and the maximum gain available in region III. A breakpoint P defining the boundary between regions II and III describes a vertical locus as gain control is effected.

The described signal processing arrangement desirably permits moderate and large amplitude vertical detail signals to be gain controlled without altering the prescribed fixed gain imparted to low signals processed in region I. The described arrangement also permits the gain in region III for large amplitude signals to be increased concurrent with a reduction in the amount of gain imparted to moderate amplitude signals in enhancement region II, to thereby minimize the loss of detail associated with large amplitude signals processed in region III.

Variable resistor 165 may correspond to a viewer adjustable control, or a manufacturing or design adjustment control which is preset to tailor the non-linear transfer response of the vertical detail signal in accordance with the requirements of various systems. Also, transistor 165 can be replaced by other variable impedance networks, such as a network including a transistor as a controlled impedance device responsive to a suitable source of gain control voltage.

What is claimed is:

1. A circuit for processing video signals, comprising:
    first means for linearly translating said signals with a first gain greater than zero;
    second means for linearly translating said signals with a second gain greater than zero;
    third means having a non-linear signal transfer function for translating small amplitude excursions of said signal with a third gain greater than zero in a first region, and for translating moderate amplitude excursions of said signal with a fourth gain greater than said third gain in a second region;
    means for combining signal outputs from said second and third translating means to substantially cancel small signal amplitude excursions; and
    means for summing signals from said first means and from said combining means.

2. A circuit according to claim 1, wherein:
    said third means additionally translates large amplitude excursions of said signal with a fifth gain less than said third gain in a third region.

3. A circuit according to claims 1 or 2, and further comprising:
    means for varying the magnitude of output signals from said combining means.

4. A circuit according to claim 3, wherein:
    said varying means comprises a variable impedance coupled to said combining means.

5. A circuit according to claim 2, and further comprising:
    a variable impedance coupled to a circuit path between said combining means and said summing means, for varying the magnitudes of moderate and large amplitude excursions of output signals from said combining means in mutually complementary fashion, whereby moderate and large amplitude excursions of signals from said summing means are varied exclusive of small signal amplitude excursions.

6. Video image vertical detail signal processing apparatus in a system for processing a video signal containing image representative luminance and chrominance components disposed within a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed chrominance signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail signal information, to the exclusion of signals occupying the band of chrominance signal frequencies;

first means for linearly translating said vertical detail signal with a first gain greater than zero;

second means for linearly translating said vertical detail signal with a second gain greater than zero;

third means having a non-linear signal transfer function for translating small amplitude excursions of said vertical detail signal with a third gain greater than zero in a first region, and for translating moderate amplitude excursions of vertical detail signal with a fourth gain greater than said third gain in a second region;

means for combining signal output from said second and third translating means to substantially cancel small amplitude excursions of said vertical detail signal;

means for summing signals from said first means and from said combining means with said combed luminance signal from said first output of said comb filter means to provide said luminance component; and luminance signal utilization means for receiving said luminance component from said summing means.

7. Apparatus according to claim 6, wherein:
said frequency selective means comprises a low pass filter; and
said video signal processing system comprises a color television receiver.

8. Apparatus according to claim 6, wherein:
said third means additionally translates large amplitude excursions of said vertical detail signal with a fifth gain less than said third gain in a third region.

9. Apparatus according to claims 6 or 8, and further comprising:
a variable impedance coupled to said combining means for varying the magnitude of vertical detail output signals from said combining means.

10. Apparatus according to claims 6 or 8, and further comprising:
a variable impedance coupled to a circuit path between said combining means and said summing means, for varying the magnitudes of moderate and large amplitude excursions of output signals from said combining means in mutually complementary fashion, whereby moderate and large amplitude excursions of signals from said summing means are varied exclusive of small signal amplitude excursions.

* * * * *